May 24, 1932.  J. P. MORLEY  1,859,745
FLUE STRUCTURE FOR HEATING APPARATUS
Filed Feb. 25, 1928
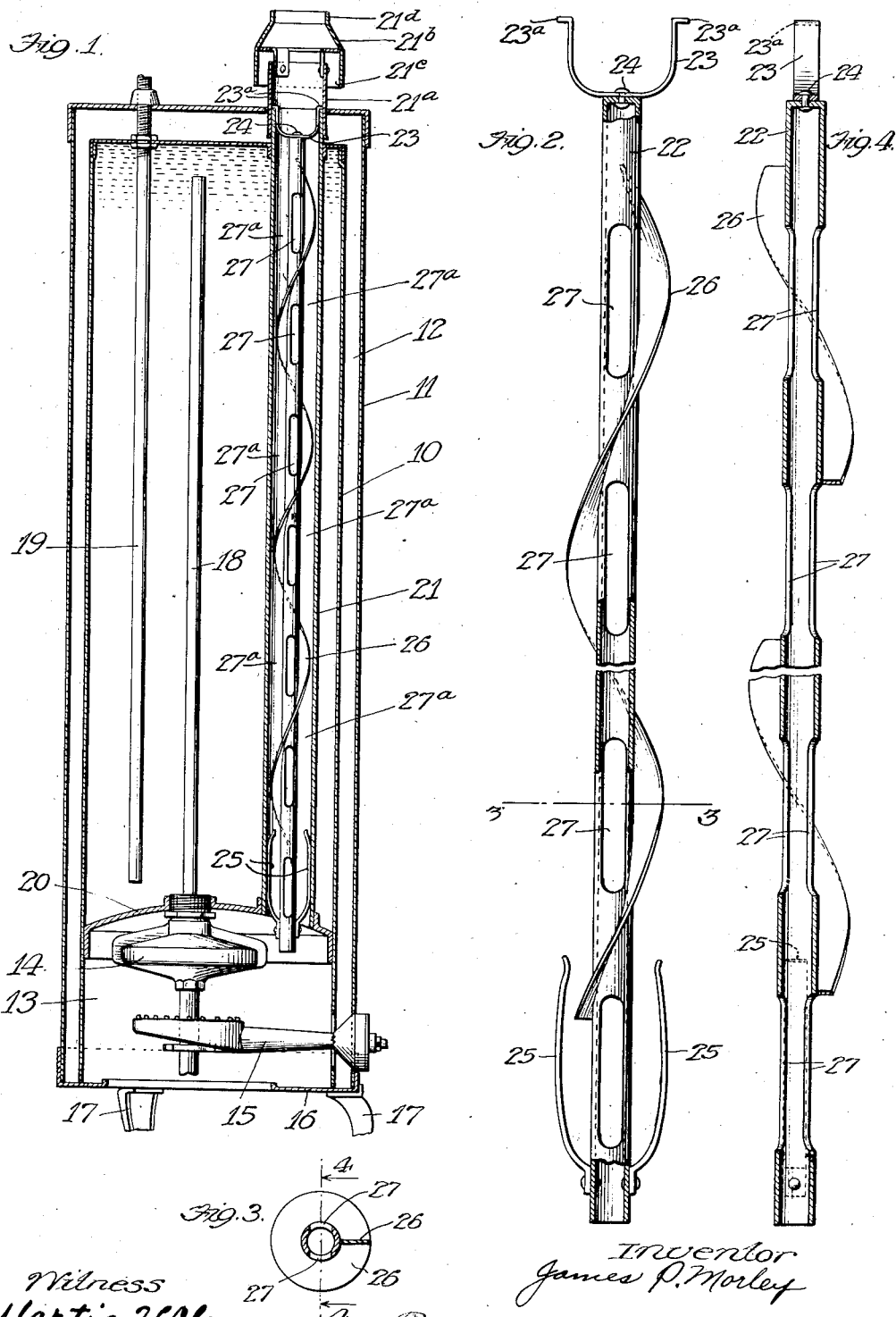
Inventor
James P. Morley
By Rector, Hibben, Davis & Macauley Attys.
Witness
Martin H. Olsen Patented May 24, 1932

1,859,745

UNITED STATES PATENT OFFICE

JAMES P. MORLEY, OF MICHIGAN CITY, INDIANA, ASSIGNOR TO BASTIAN-MORLEY COMPANY, OF LA PORTE, INDIANA, A CORPORATION OF INDIANA

FLUE STRUCTURE FOR HEATING APPARATUS

Application filed February 25, 1928. Serial No. 257,060.

My invention relates generally to heating apparatus and has to do particularly with flue, and the like, structure which is adapted primarily for use with water heaters, but which has utility in connection with heating apparatus used in various other instances, such as that which may be employed in the heating of the interior of buildings, or other enclosures, regardless whether the heating medium be of a gaseous or fluid form.

My invention is well adapted to water heaters of the type in which a flue for carrying away products of combustion passes through the water in the storage tank whereby the heat from the hot gases passing therethrough may be utilized for heating the water in the tank; and reference to water heaters of this character is made for the purpose of facilitating explanation of my invention. Heretofore, in the use of such heaters, it has been found that some of the gases which enter the flue are, or later become, cold and dead gases which tend to collect along the wall of the flue and form cold insulating films thereon with the result that the oncoming and hotter flue gases are rendered practically ineffective for heating of the water in the tank. This tends to make such heaters rather expensive in operation.

It will be readily appreciated that if some means were provided to keep all of the flue gases, or heating medium, in motion, and to stir up these cold insulating films and to mix the oncoming and hotter gases, or heating medium, therewith, the heating medium within and passing through the flue would be fully effective to aid in heating the water in the tank. Various devices, such as baffles and the like, have been suggested for use within the flue to set up a turbulent condition therein in endeavoring to overcome the above abjectionable features. However, all such devices have proved to be highly undesirable and ineffective because of certain detrimental results caused thereby. More particularly, the flue must not be restricted, such as would be the case by the use of the previously suggested baffles, because by restriction the above conditions are aggravated instead of remedied. Furthermore, restriction in the flue of a water heater, such as above mentioned, hinders complete combustion with the result that previously suggested forms of baffles, and the like, by their presence in the flue and their mode of functioning, serve to lower the heater efficiency to a great extent instead of increasing the same.

Objectionable conditions similar to the foregoing may exist in heating apparatus used for heating the interior of a building, or other enclosure, and wherein the heating medium, which may be a gas or fluid, passes through a heating chamber, or a series of heating chambers, as in the well-known forms of radiators, stoves, or the like; and such conditions in these instances would, likewise, prevent the proper transfer of heat from the heating medium to the medium to be heated.

One of the principal objects of my invention is to provide a simple and inexpensive flue structure wherein all of the foregoing objectionable features are eliminated, and whereby the heating medium is positively directed into the cooler areas along the walls of the flue, and all parts of such medium are admixed and caused to move along whereby they are all maintained hot, active and fully effective.

Another important object of my invention is to accomplish the directing and mixing of the heating medium by means of baffle structure which is so constructed that no appreciable restriction to the circulation of the medium throughout the length of the flue is offered. More particularly, I provide a baffle within the flue which extends in close proximity to the flue wall whereby the normal circulation of the oncoming heating medium is through a passage extending throughout the flue and adjacent the walls of the flue throughout its length. I also provide means so associated with this baffle that any abnormal flow condition at any particular point throughout the flue is relieved to eliminate the possibility of restriction and pressure and volume conditions throughout the flue are equalized regardless of temperature conditions. One form of structure which I may employ to this end may include a hollow tubular member disposed centrally within the flue and carrying thereon, in edgewise relation, a spirally wound and continuous blade or fin, the tubular member being provided at intervals on opposite sides of the spiral blade with openings which play an important part in elimination of restriction.

A further and more specific object is to increase the efficiency of water heaters to a maximum extent by providing for receiving the full benefit of all the heat derived from the burner; that is, I positively provide for utilization of the heat of all of the gases which contact with the various heater parts.

Heretofore, from the standpoint of efficiency and fuel economy, it has been found advisable in water heaters to use a flue of comparatively small diameter. However, in such cases, where attempts have been made to employ baffles in the flue, this feature of economy has been sacrificed by the use of large flues in an attempt to get away from the objection of restriction. An additional advantage of my invention is that it permits of the use of a relatively small flue and incorporation therein of a baffle, all without the objectionable effect of restriction.

Other objects and advantages will become apparent as this description progresses and by reference to the drawings wherein,—

Figure 1 is a vertical sectional view of one form of water heater embodying my invention;

Fig. 2 is an enlarged elevated view partially in section, of the flue baffle structure shown in Fig. 1;

Fig. 3 is a horizontal section taken on line 3—3 of Fig. 2; and

Fig. 4 is a vertical section taken on line 4—4 of Fig. 3.

The form of water heater which I have chosen to illustrate my invention includes a storage tank 10 surrounded by a spaced casing 11 so as to provide an insulating space 12. This insulating space may be a dead air space or it may be filled with a heat insulating material such as asbestos or the like. The wall of the storage tank and the outer casing 11 are extended downwardly to provide a combustion chamber 13 in which are located the spreader 14 and burner 15. The tank and outer casing are supported upon a base 16 which is, in turn, supported by the usual form of legs 17. The spreader 14 is connected to the bottom of the tank in communication with the interior thereof, as will be well understood, and it is provided with a riser or circulating pipe 18 leading interiorly to a point near the top of the tank. The tank is provided with the usual cold water inlet pipe 19, which extends to a point near the bottom, and a service pipe leading from the top thereof.

The operation of the structure so far described is obvious and may be stated generally as follows: With the burner 15 in operation, the flame therefrom strikes the lower side of the spreader 14 and heats that surface. This flame is deflected around the walls of the spreader and upwardly against the bottom 20 of the storage tank 10. The hot gases from the burner which strike the bottom 20 of the storage tank aid in heating the water therein. As the cold water enters the spreader from lower part of the tank and is heated, it passes therethrough and enters the riser or circulating pipe 18 and is delivered to the storage tank near the top. This action takes place continuously and the water in the storage tank finally becomes heated to the desired extent. The action of the burner may be controlled manually, or by thermostatic means under the control of the temperature of the water in the tank as will be well understood by those skilled in the art.

The heater is provided with a flue 21, which is carried by the opposite end walls of the storage tank in such a way that it leads from the combustion chamber 13 through the water in the storage tank to the outer part of the casing 11. The upper end of this flue is provided with a removable extension 21ª which carries an additional flue device 21ᵇ in communication with the atmosphere through the skirt portion 21ᶜ. This device is provided with a joint portion 21ᵈ which is adapted to receive a pipe or other suitable conduit for carrying the products of combustion to some remote point. The hot gases from the burner 15 eventually find their way into the flue 21, and as hereinbefore explained, it is desirable that such gases be utilized as an additional agent in the heating of the water in the tank. Part of these gases by the time they enter the flue, or after entering the flue and before they have passed entirely therethrough, may become dead and inactive and, unless otherwise provided for, they form insulating films along the wall of the flue and prevent transfer of the heat from hotter gases within the central part of the flue through the flue walls to the water in the tank.

My invention provides means for preventing the collection of these cold and dead gases within the flue, such means being adapted to render all of the flue gases completely effective as heating agents as they pass through the flue. In this respect, according to the form shown in the drawings, I employ a hollow tube 22, which is suspended centrally within the flue by means of a bracket 23 secured to the upper end thereof as by rivet 24. This bracket preferably takes the form of a flexible U-shaped metal strip having horizontally projecting flanges 23ª at the ends of the U-arms which extend over to upper edge of the flue so as to hold the tube 22 in a predetermined vertical position therein. The width of the U-bracket 23 may be slightly greater than the diameter of the flue so that upon insertion of the tube and bracket within the upper end of the tube as shown in Fig. 1, the arms of the U-bracket will have a clamping effect to hold the tube rigidly in its central position. The lower end of the tube 22, which preferably, but not necessarily, projects slightly beneath the flue into the combustion chamber 13, is positioned centrally within the flue by means of a pair of diametrically opposed spring fingers 25 which press outwardly against the walls of the flue as will be well understood from Figs. 1 and 2. These spring fingers 25 may be secured to the tube at the desired point in any suitable manner.

The tube 22 serves as a support for a spiral blade 26 which is rigidly secured to the tube in edgewise relation thereto as clearly shown in Figs. 2 to 4. This blade 26 is of such width that it extends close to the wall of the flue. It will be readily seen that this blade provides an irregular and spirally shaped flue passage, and the hot burner gases which enter the flue will normally take a spiral path therethrough and pass directly along and into the zone adjacent the wall of the flue so that all the gases within the flue are mixed and set in motion. Thus, the oncoming hotter flue gases at the central part of the flue are directed positively toward and into the cooler wall zone.

It will be appreciated that, as hereinbefore explained, the presence of this spiral baffle blade and tube 22 might lower the efficiency of the heater by aggravation of the dead gas conditions and by preventing proper combustion, unless some means is provided for preventing restriction due either to the spiral flue passage or the physical presence of the tube 22 and blade 26. I eliminate all restriction effects by providing the tube 22, at intervals throughout its length, with pairs of diametrically opposed openings 27. These openings are so spaced that they are disposed on the opposite sides of the adjacent blade surfaces. By practical demonstration, I have found that these openings eliminate all traces of restriction, and all of the burner gases are rendered 100 per cent effective and the full benefit of their heat may be utilized in heating the water in the tank. All objectionable features existent in connection with the use of previous baffle devices in the flue are eliminated.

There are several factors which contribute to this new and highly useful result. One important factor is that as the hot gases enter and pass along the flue, they tend to follow the course which offers the least resistance. This course is normally the spiral path as determined by the blade 26. However, unless provided against, the continuous high-rate flow and expansion of the gases in the flue would bring about a condition wherein the spiral passage could not carry the gases away fast enough and there would be a building-up or choking effect due to the restriction offered by the blade 26. The openings 27 on the opposite sides of the blade compensate for this condition. As the flow of gas approaches the point where restriction would be offered to such flow, the tendency of the gas to take the course of least resistance causes part of it to enter the openings 27 at that point and pass upwardly through the tube 22 and out through the next openings 27 into the space above the blade. In other words, the spiral blade provides, in effect, successive and connected gas chambers or pockets 27ª, and the openings 27 serve to by-pass part of the gas from one chamber or pocket (on one side of the blade) into the succeeding and lower pressure chamber or pocket (on the opposite side of the blade) similarly to the action of a pressure relief valve. The remainder of the hot gases will pass from the center of the flue along the spiral passage through the cooler wall zone into the succeeding chamber or pocket.

It may be further explained that the gases at the top of the flue are much cooler than those entering at the bottom and that each succeeding flue space 27ª is a cooler and lower pressure zone. The pressure is, therefore, greater at the bottom of the flue due to the hotter gases. The hotter gases at the bottom expand more rapidly than those at the top, and obviously the tendency for restriction is greater at the bottom. The bottom openings 27 are immediately effective to relieve this restriction tendency and they permit this rapidly expanding gas to flow upwardly through the hollow support 22 toward and into the cooler and lower pressure zones. This action may take place step by step by the continuous by-passing of the gases from one side of the blade to the other. When such gases are by-passed to the opposite side of the blade and into a different and cooler and lower pressure chamber or pocket, such gases that are still unable to freely pass along the spiral path, from that chamber will continue upward through the openings leading from that chamber into the next succeeding and lower pressure zone. This action results in equalization of the pressures on the opposite sides of the blade at any particular point throughout the length of the flue, regardless of the temperature condition of the gases on the opposite sides of the blade at any point. Restriction is brought about, in part, by the difference in temperature of the gases at different locations in the flue and the foregoing arrangement is of importance in that such condition is neutralized and the gases are caused to pass along in a free manner.

It is also apparent that, in conjunction with the foregoing, the gases in entering the openings 27, on one side of the blade and passing through the hollow tube 22 and out through the openings on the other side of such blade may create an additional induction condition which causes an increase in the rate of circulation of the gases. Thus, this action may be compared, in effect, to the action of an injector tube. This condition may be aided in the fact that the tube 22 is located at the central portion of the flue where the gases are naturally hotter than those near the wall of the tube, and the fact that the flue pockets toward which the gas flows are each a cooler and lower temperature zone. More particularly, the hotter gases in passing through the openings in the tube 22 travel at a high rate and expand very rapidly, whereby a differential pressure condition is set up which causes a rapid flow of the gases upwardly through the flue and away from the flue wall. This condition may play an important part in the elimination of restriction conditions which might otherwise exist by the physical presence of the tube 22 and blade 26 within the flue. That is to say, while the mere physical existence of the tube and blade within the flue would ordinarily seem to bring about at least a slight restriction condition, yet their presence causes no appreciable effect in that direction, and the flow action is substantially the same as if the tube and baffle blade were not present.

It will be obvious that in the use of my invention the efficiency of the water heater is greatly increased by rendering all gases of combusion fully effective while passing from the burner to the external flue structure, and fuel consumption is greatly reduced with a resultant reduction in cost of operation. My invention is also of such character that it may be readily applied to water heaters already in use very readily and quickly and at a very low cost. It is very simple in construction and fills a long-felt need in connection with water heaters.

It will be understood that my invention is not limited to the particular form of heater shown nor even to water heaters, but has utility in any form of heating apparatus where like conditions are to be met and regardless whether the heating medium be of gaseous or fluid form; and it will be understood that in referring to the flue, the term is used in a broad sense as referring to any chamber or conduit through which the heating medium passes. Furthermore, various changes may be made in details and arrangement of parts of the illustrated form of my invention without departing from the spirit and scope of my invention as defined by the claims which follow.

I claim:

1. In a heating apparatus embodying a combustion chamber having a flue leading from the combustion chamber and a burner therein, means for directing said gases in a spiral-like course through said flue, and means for by-passing some of said gases from said spiral-like course in a direct central course part of the distance through said flue when restriction is offered to the flow through the irregular course.

2. In a heating apparatus, the combination of a combustion chamber having a burner therein and a flue leading therefrom, a spiral baffle in said flue and of such width that it extends from a point adjacent the central part of the flue to a point close to the wall of the flue for directing the flue gases along a tortuous path and into the zone along the flue wall, a support for said baffle, and means other than said baffle for by-passing part of the gases from one side of said baffle to the other side in a direct path.

3. In a water heater, the combination of a combustion chamber having a burner therein and a flue leading therefrom, a hollow member supported centrally of and within said flue, a spiral baffle plate carried by said member in edgewise relation thereto and extending into a zone adjacent the flue wall, said plate being adapted to cause gases of combustion to take a spiral path through the flue, said member having openings at intervals throughout its length on the opposite sides of the adjacent portions of said spiral plate and leading into the spaces on the opposite sides of said spiral plate, whereby some of the gases of combustion are by-passed through said member from one side of said blade to the other at various points therealong.

4. In a flue for a heating apparatus, a spiral baffle plate defining a spiral passage for a heating medium, a support for said baffle plate, and means for by-passing part of the heating medium from said spiral passage through said support directly through a major portion of said flue.

5. In a heating apparatus, a flue adapted to carry away products of combustion, a tubular member, a spiral blade carried by said member in edgewise relation thereto and extending adjacent the flue wall to provide a spiral flue passage to positively deflect the products of combustion into the zone adjacent the flue wall, pairs of opposed openings arranged at intervals through the length of said member, said pairs of openings being so spaced that adjacent pairs are on opposite sides of the adjacent portion of said blade, and means for removably suspending and spacing said member within the flue.

6. In flue structure adapted to carry away products of combustion, a tubular member, a spiral blade carried by said member in edgewise relation thereto and extending adjacent the flue wall to provide a spiral flue passage, pairs of opposed openings arranged at intervals through the length of said member, said pairs of openings being so spaced that adjacent pairs are on opposite sides of the adjacent portion of said blade, a clamp member carried by one end of said tubular member for suspending and positioning the same vertically and laterally within the flue, and a device at the other end of said tubular member for positioning such end in the tube.

7. In a water heater, the combination of a storage tank, a combustion chamber, a water circulating member in said combustion chamber, a hot-gas discharging member in said combustion chamber, a flue leading from said combustion chamber in contact with the water in said tank and adapted to receive and carry away hot gases from said combustion chamber, and means within said flue for rendering said flue-gases fully effective to aid in heating the water in said tank, said means including a centrally disposed hollow support, and a spiral deflector carried by said support which causes gases of combustion to take a spiral path through the flue in close proximity to the flue wall, said support being perforated at intervals on opposite sides of the adjacent portion of said deflector for by-passing the gases from said spiral path directly along the central portion of the flue to relieve flow restriction offered by said spiral path.

8. In a heating apparatus, a chamber, means for discharging a heating medium into said chamber, spiral means for normally directing the medium from the central portion of the chamber through a single continuous, generally-upward spiral path throughout said chamber, said means also deflecting the medium into a zone along the chamber wall, and said means including a tubular device having a plurality of openings along its wall communicating with said path between each of the complete turns of said spiral means, for releasing pressure build-up and substantially equalizing pressure of the heating medium at all points throughout said chamber.

9. A flue structure comprising a flue pipe, baffle members including a spiral blade in said pipe for causing the gases therethrough to tend to follow a predetermined spiral path, and centrally-disposed means including a duct communicating with the interior of said pipe and said spiral path between each complete turn of said spiral blade for by-passing a part of the gases centrally through said pipe.

In testimony whereof, I have subscribed my name.

JAMES P. MORLEY.